United States Patent
Singhal

(10) Patent No.: US 10,986,212 B2
(45) Date of Patent: Apr. 20, 2021

(54) METHOD A SERVER AND A CLIENT FOR POLICY BASED CONTROL OF M2M DEVICES

(71) Applicant: Telefonaktiebolaget LM Ericsson (publ), Stockholm (SE)

(72) Inventor: Sumit Singhal, Karlskrona (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 447 days.

(21) Appl. No.: 15/735,216

(22) PCT Filed: Jul. 30, 2015

(86) PCT No.: PCT/SE2015/050838
§ 371 (c)(1),
(2) Date: Dec. 11, 2017

(87) PCT Pub. No.: WO2017/018915
PCT Pub. Date: Feb. 2, 2017

(65) Prior Publication Data
US 2018/0183897 A1    Jun. 28, 2018

(51) Int. Cl.
*H04L 29/08* (2006.01)
*H04W 4/50* (2018.01)
(Continued)

(52) U.S. Cl.
CPC ............ *H04L 67/34* (2013.01); *G06F 21/305* (2013.01); *G06F 21/6236* (2013.01);
(Continued)

(58) Field of Classification Search
CPC ....... H04L 67/34; H04L 67/125; H04L 67/12; H04L 67/42; H04W 4/021; H04W 4/70;
(Continued)

(56) References Cited

U.S. PATENT DOCUMENTS 9,780,996 B2 * 10/2017 Weens ................ H04L 41/0803
2014/0351312 A1 * 11/2014 Lu ........................... H04W 4/70
709/201

(Continued)

OTHER PUBLICATIONS

Modacom, "The needs for change of "Sleep/Awake time scheduling" of the device by the Server/ GW's policy or request," European Telecommunications Standards Institute (ETSI), Draft; M2M(11)0476r1, vol. Smart2M, Jun. 27, 2011, Sophia-Antipolis, France, pp. 1-6.

*Primary Examiner* — Yves Dalencourt
*Assistant Examiner* — Sahera Halim
(74) *Attorney, Agent, or Firm* — Sage Patent Group

(57) ABSTRACT

A method executed at a M2M server, capable of interacting with a remotely located M2M client, is suggested. The method comprise: acquiring resources and/or parameters for provisioning a policy applicable for the M2M client; initiating formulation of the policy by arranging policy dependent mutually associated objects based on said resources and/or parameters, such that a M2M client on which the policy has been provisioned is capable of making decisions on the basis of said policy without having to communicate with any external device, and, initiating provisioning of the policy by provisioning said objects on the M2M client.

32 Claims, 10 Drawing Sheets

(51) Int. Cl.
    *H04W 4/70*      (2018.01)
    *G06F 21/62*     (2013.01)
    *G06F 21/30*     (2013.01)
    *H04L 29/06*     (2006.01)
    *H04W 4/021*     (2018.01)

(52) U.S. Cl.
    CPC ............ *H04L 67/12* (2013.01); *H04L 67/125* (2013.01); *H04L 67/42* (2013.01); *H04W 4/50* (2018.02); *H04W 4/70* (2018.02); *G06F 2221/2111* (2013.01); *G06F 2221/2141* (2013.01); *G06F 2221/2151* (2013.01); *H04W 4/021* (2013.01)

(58) Field of Classification Search
    CPC .... H04W 4/50; G06F 21/305; G06F 21/6236; G06F 2221/2111; G06F 2221/2141; G06F 2221/2151
    USPC ........................................................ 709/220
    See application file for complete search history.

(56) References Cited

U.S. PATENT DOCUMENTS

| | | | |
|---|---|---|---|
| 2015/0223109 A1* | 8/2015 | Raleigh ............... | H04L 12/1496 370/230 |
| 2015/0365293 A1* | 12/2015 | Madrigal ............ | H04L 41/0893 709/221 |
| 2016/0007288 A1* | 1/2016 | Samardzija ......... | H04W 56/001 370/311 |
| 2016/0182297 A1* | 6/2016 | Dauneria ............ | H04L 41/0826 709/224 |

* cited by examiner

| Name | Object ID | | | | | |
|---|---|---|---|---|---|---|
| PolicyRule | 20 | | | | | |
| | Name | Operations | Instances | Mandatory | Type | Description |
| 0 | Rule Priority | RW | Single | Mandatory | Integer | Provides the priority of a PolicyRule instance, for determining in which order to apply different PolicyRule instances in a case more than one is true |
| 1 | Rule Active | R | Single | Mandatory | Boolean | Indicates if a PolicyRule instance has been set to Active (true) or Inactive (false). Default value is false which is set to true once the respective PolicyRule instance is made active. |
| 2 | Cond Ref | RW | Multiple | Optional | String | Maintains a list of references to conditions that need to be met in order for a PolicyRule instance to be active. These references may e.g. be made to a PolicyLoction Object or to a PolicyTime Object |
| 3 | Decision Ref | RW | Multiple | Optional | String | Maintains a list of references to operations that need to be taken when the PolicyRule instance is made active. The reference points to PolicyDecision instances |

Figure 7

| Name | Object ID | | | | |
|---|---|---|---|---|---|
| PolicyLocation | 21 | | | | |

| ID | Name | Operations | Instances | Mandatory | Type | Description |
|---|---|---|---|---|---|---|
| 0 | Geo Lat | RW | Single | Mandatory | String | Provides the Policy Location Latitude |
| 1 | Geo Long | RW | Single | Mandatory | String | Provided the Policy Location Longitude |
| 2 | Geo Alt | RW | Single | Optional | String | Provides the Policy Altitude as defined in meters above sea level |
| 3 | Geo Proximity | RW | Single | Optional | Integer | Provides the proximity in m of the GeoLat,GoeLong and GeoAlt |

Figure 9

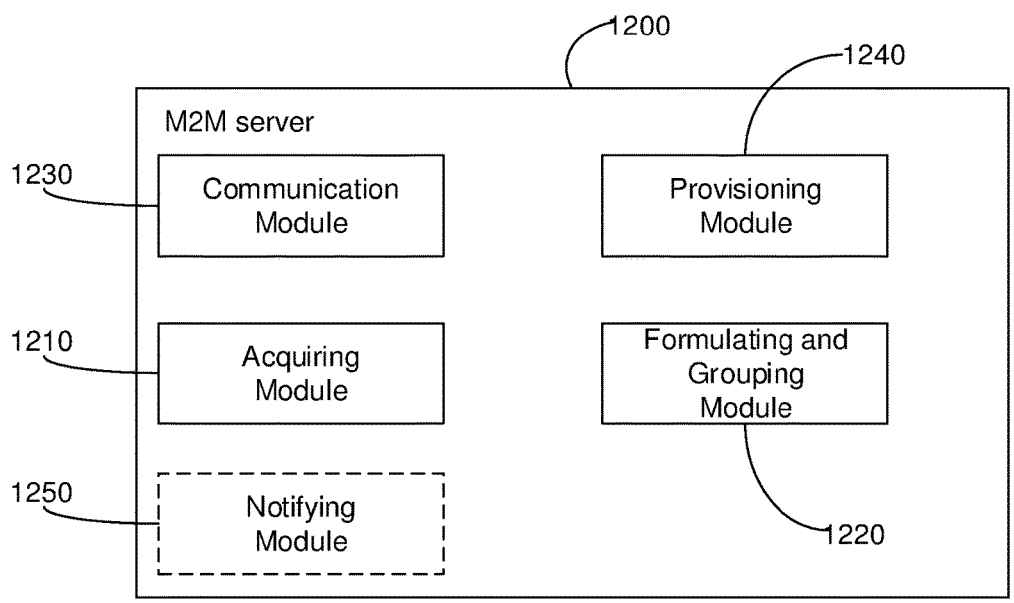

Figure 12

METHOD A SERVER AND A CLIENT FOR POLICY BASED CONTROL OF M2M DEVICES

TECHNICAL FIELD

The present disclosure relates to a M2M server-client interaction, as well as a M2M client and a M2M server capable of participate in such an interaction.

BACKGROUND

The term Internet of Things (IoT) has come to describe a concept, covering a number of technologies and research disciplines that enable the Internet to reach out into the real world of a wide variety of physical objects, foreshadowing an exciting future that closely interlinks the physical world and cyberspace—a development that is not only relevant to researchers, but to corporations and individuals alike. This development is now moving, not only into the traditional operator space, but also to other areas, such as e.g. home automation, transportation and healthcare. This concept includes widespread use of fixed, as well as mobile Machine to machine (M2M) devices, which may also be referred to as M2M clients. This type of devices or clients are deployed to collect data and provide the collected data to the network to which the devices are connected for further processing over any type of suitable short or long range technology.

Considering the foreseen use of 26 Billion M2M devices by 2020, the traffic or payload generated by M2M devices, which can typically be described as involving a numerous number of small size messages, gives rise to a demand for networks which can be optimized for efficient use of its resources. In this respect it is important that the amount of signalling between the M2M devices and the server is kept at a minimum.

A large amount of M2M devices are expected to be severely constrained, in terms of one or more of memory capacity, CPU and power capacity, e.g. since implemented with minimum space available and/or running on low power batteries. These types of M2M devices are commonly referred to as constrained M2M devices.

The Lightweight M2M (LWM2M) is a new standard which has been developed by the Open Mobile Alliance (OMA), which focuses on constrained fixed and cellular M2M devices. This standard defines an efficient device-server interface which is based on the open Internet Engineering Task Force (IEFT) standards Constrained Application Protocol (CoAP) and Datagram Transport Layer Security (DTLS). The LWM2M enabler that captures a set of interfaces and an efficient payload, based on a simple flat client server architecture, includes device management and service enablement for LWM2M devices, and makes use of a light and compact protocol, as well as an efficient resource data model.

With the increase in the number of used M2M devices, and especially constrained M2M devices, networks will be impacted with a lot of traffic generated out of message exchange between M2M devices and their servers, and especially for the constrained M2M devices this is an issue that need to be addressed. Even though each payload originating from a M2M device may be small, a growing number of accumulated messages can cause unwanted delays and congestions to the networks.

Also when looking from the server's point of view, a server handling multiple M2M devices will typically be heavily occupied with processing messages received on applicable interfaces, which is an undesirable situation from an efficiency point of view.

SUMMARY

It is an object of the present document to address, or at least alleviate, the problem described above.

According to one aspect, a method executed at a M2M server for interacting with a remotely located M2M client, is suggested, where the method comprise: acquiring resources and/or parameters for provisioning a policy, applicable for the M2M client; initiating formulation of the policy by arranging policy dependent, mutually associated, objects based on the mentioned resources and/or parameters, such that a M2M client on which the policy has been provisioned is capable of making decisions on the basis of said policy, without having to communicate with any external device, and initiating provisioning of the policy, by provisioning said objects on the M2M client.

By applying the suggested method, the signaling between the M2M client and the M2M server can be reduced.

In addition, in order to provide for regular notifications of relevant updates when executed at a M2M client, the method suggested above may also comprise: identifying a need for notifications of an executed change of a value of one of the resources or parameters at the M2M client; initiating transmission of a request for the mentioned notifications to the M2M client, and receiving, from the M2M client, in response to the request, a notification of a change of the mentioned value at the M2M client.

Furthermore, in order to also provide for updates of a provisioned policy, the method may also comprise: determining that an update of the previously provisioned policy is required, by updating at least one of said resources or parameters, and initiating updated provisioning of the policy on the M2M client.

The suggested provisioning may be divided in a number of steps, wherein the suggested policy normally comprises configuring a first object comprising resources and/or parameters indicative of at least one condition that need to be met for the M2M client to activate or inactivate said provisioned policy.

The policy formulation typically also comprises configuring said first object such that a respective priority is applicable for said at least one condition, as well as configuring a second object comprising resources and/or parameters indicative of at least one time dependent condition that need to be met for the M2M client to activate or inactivate said provisioned policy.

In addition, the suggested policy formulation also typically comprise configuring a third object comprising resources and/or parameters indicative of at least one location dependent condition that need to be met for the M2M client to activate or inactivate said provisioned policy and configuring a fourth object comprising resources and/or parameters indicative of operations executable by said M2M client when associated conditions have been met at the M2M client.

In association with the suggested policy formulation sequence as suggested above, or after the described sequence, the formulation can be continued by grouping objects, by mutually linking the objects and their associated resources so that a policy for executing predefined operations according to predefined conditions is obtained.

According to another aspect, a computer program for a M2M server, for enabling interaction with a remotely located M2M client is suggested, where the computer program comprise computer readable instructions, which, when executed by at least one processor of the M2M server, causes the M2M server to perform a method according to any of the embodiments mentioned above.

According to yet another aspect, a computer program product is suggested, which comprise a computer program as suggested above, where the computer program product further comprise a computer readable means on which the computer program is stored.

According to another aspect a method executed at an M2M client capable of interacting with a remotely located M2M server is suggested, where the method comprise: allowing the M2M server to provision a policy as defined by mutually associated objects at the M2M client; recognizing that at least one condition specified by resources and/or parameters associated with said policy is fulfilled, and making a decision on the basis of said policy and the fulfilled associated conditions without having to communicate with any external device.

In case the M2M client is also capable of handling notification requests from the M2M client the method also comprise: receiving a request from the M2M server requesting the M2M client to notify the M2M server of an executed change of a value of one of the resources or parameters at the M2M client; updating a notification trigger on the basis of the received notification request; recognizing a change of the value of one of the resources or parameters, and transmitting a notification of the requested and recognized change to the M2M server.

A policy provisioned at an M2M client is typically also updatable. In such a situation, the method suggested above also comprise: allowing the M2M server to update the previously provisioned policy by provisioning the policy with updated resources and/or parameters, and applying the updated at least one resource or parameter when making decisions on the basis of said policy and fulfilled associated conditions.

The provisioning process suggested above may be executed in one or more sequences, including at least some of the following steps: considering resources and/or parameters of a first object and indicative of at least one condition that need to be met for the M2M client to activate or inactivate said provisioned policy; considering a resource and/or parameter of the first object specifying a respective priority applicable for said at least one condition; considering resources and/or parameters of a second object indicative of at least one time dependent condition that need to be met for the M2M client to activate or inactivate said provisioned policy; considering resources and/or parameters of a third object indicative of at least one location dependent condition that need to be met for the M2M client to activate or inactivate said provisioned policy, and considering resources and/or parameters of a fourth object indicative of operations executable by said M2M client when said conditions have been met at the M2M client.

When requiring an update of a previously executed provisioning, the method suggested above may further comprise: acquiring a parameter value; determining that the acquired parameter value is relevant for provisioning of the M2M client; transmitting the parameter value to the M2M client, and allowing the M2M server to provision the M2M client based on said parameter.

According to another aspect, a computer program for a M2M client, for enabling interaction with a remotely located M2M server is suggested, where the computer program comprise computer readable instructions, which, when executed by at least one processor of the M2M client, causes the M2M client to perform a method according to any of the embodiments mentioned above.

According to yet another aspect, a computer program product is suggested, which comprise a computer program for an M2M client, as suggested above, where the computer program product further comprise a computer readable means on which the computer program is stored.

According to yet another aspect, an M2M server for interacting with a remotely located M2M client, as suggested above, is provided, where such a M2M server comprise a processor and a memory, comprising instructions, which when executed by the processor causes the M2M server to: acquire resources and/or parameters for provisioning a policy applicable for the M2M client; initiate formulation of the policy, by arranging policy dependent mutually associated objects, based on said resources and/or parameters, such that a M2M client on which the policy has been provisioned is capable of making decisions on the basis of said policy, without having to communicate with any external device, and initiate provisioning of the policy by provisioning the mentioned objects on the M2M client.

The suggested M2M server may be adapted to identify a need for notifications of an executed change of a value of one of the resources or parameters at the M2M client, wherein the memory further comprise instructions, which when executed by the processor causes the M2M server to: identify a need for notifications of an executed change of a value of one of the resources or parameters at the M2M client; initiate transmission of a request for the required notifications to the M2M client, and receive, from the M2M client, in response to the request, a notification of a change of the mentioned value at the M2M client.

In order to be able to also update a provisioned policy at a M2M client, the memory of the M2M server may also comprise instructions, which when executed by the processor causes the M2M server to: determine that an update of the previously provisioned policy is required, by updating at least one of the mentioned resources or parameters, and initiate updated provisioning of the policy on the M2M client.

The M2M server suggested above may be configured to provision policies in one or more steps, and therefore the memory further comprise instructions, which when executed by the processor causes the M2M server to formulate a policy by configuring a first object, comprising resources and/or parameters, indicative of at least one condition that need to be met for the M2M client to activate or inactivate said provisioned policy. Furthermore, the M2M server may also comprise means for configuring the mentioned first object, such that a respective priority is applicable for the at least one condition, thereby providing for priority based policies.

Furthermore, the memory of the M2M server also typically comprise instructions, which when executed by the processor causes the M2M server to formulate a policy by configuring a second object, comprising resources and/or parameters, indicative of at least one time dependent condition that need to be met for the M2M client to activate or inactivate a provisioned policy; by configuring a third object comprising resources and/or parameters indicative of at least one location dependent condition that need to be met for the M2M client to activate or inactivate a provisioned policy; by configuring a fourth object comprising resources and/or parameters indicative of operations executable by the M2M client when associated conditions have been met at the M2M client, and for policy formulation by grouping objects, by mutually linking the objects and their associated resources so that a policy for executing predefined operations according to predefined conditions is obtained.

The M2M server suggested above may e.g. be configured as a LWM2M compliant M2M server.

According to another embodiment, an M2M server, such as the one suggested above, may instead be configures as comprising: an acquiring module for acquiring resources and/or parameters for provisioning a policy applicable for the M2M client; a formulation and grouping module for initiating formulation of the policy by arranging policy dependent mutually associated objects, based on said resources and/or parameters, such that a M2M client, on which the policy has been provisioned, is capable of making decisions on the basis of the mentioned policy without having to communicate with any external device, and a provisioning module for Initiating provisioning of the policy by provisioning the mentioned objects on the M2M client.

According to another aspect a M2M client, capable of interacting with a remotely located M2M and a memory, said memory comprising instructions which when executed by the processor causes the M2M client to: allow the M2M server to provision a policy as defined by mutually associated objects at the M2M client; recognize that at least one condition specified by resources and/or parameters associated with said policy is fulfilled, and make a decision on the basis of the mentioned policy and the fulfilled associated conditions without having to communicate with any external device.

The memory of suggested M2M client typically also comprise instructions, which when executed by the processor causes the M2M client to: receive a request from the M2M server requesting the M2M client to notify the M2M server of an executed change of a value of one of the resources or parameters at the M2M client; recognize a change of the value of one of the resources or parameters, and transmit a notification of the requested and recognized change to the M2M server.

The memory of the M2M client may also comprise instructions, which when executed by the processor causes the M2M client to: allow the M2M server to update the previously provisioned policy, by provisioning the policy with updated resources and/or parameters, and apply the updated at least one resource or parameter when making decisions, on the basis of the mentioned policy and fulfilled associated conditions.

As indicated above, provisioning may be executed in one or more steps. Therefore the memory of the M2M client also comprise instructions, which when executed by the processor causes the M2M client to make the mentioned decision by considering resources and/or parameters of a first object and indicative of at least one condition that need to be met for the M2M client to activate or inactivate said provisioned policy, wherein a resource and/or parameter of the first object can be considered by specifying a respective priority applicable for the mentioned at least one condition.

The memory of the M2M client also comprise instructions, which when executed by the processor causes the M2M client to: make the mentioned decision by considering resources and/or parameters of a second object indicative of at least one time dependent condition that need to be met for the M2M client to activate or inactivate the mentioned provisioned policy; making the mentioned decision by considering resources and/or parameters of a third object indicative of at least one location dependent condition that need to be met for the M2M client to activate or inactivate the mentioned provisioned policy; make the mentioned decision by considering resources and/or parameters of a fourth object indicative of operations executable by said M2M client when the mentioned conditions have been met at the M2M client.

Also the M2M client, mentioned above can have impact on how it should be provisioned. If capable of effecting the provisioning, the memory of the M2M client also comprises instructions, which when executed by the processor causes the M2M client to: acquire a parameter value; determining that the acquired parameter value is relevant for provisioning of the M2M client; transmitting the parameter value to the M2M client, and allow the M2M server to provision the M2M client, based on the mentioned parameter.

According to another embodiment, a M2M client is configured comprising: a policy module, enabling the M2M server to provision a policy at the M2M client via a communication module, as defined by mutually associated objects, a recognizing module, configured to recognize that at least one condition specified by resources and/or parameters associated with the mentioned policy is fulfilled, and a decision making module configured to make a decision on the basis of the mentioned policy and the fulfilled associated conditions, without having to communicate with any external device.

Any of the M2M clients suggested above may e.g. be a LWM2M compliant M2M client.

BRIEF DESCRIPTION OF DRAWINGS

Embodiments will now be described in more detail in relation to the accompanying drawings, in which:

FIG. 7 is a table illustrating a configuration of a PolicyRule Object, according to one embodiment.

FIG. 9 is yet another table illustrating a configuration of a PolicyLocation Object, according to one embodiment.

FIG. 12 is a block scheme, illustrating a M2M server, according to a first embodiment.

DETAILED DESCRIPTION

Figure 1:
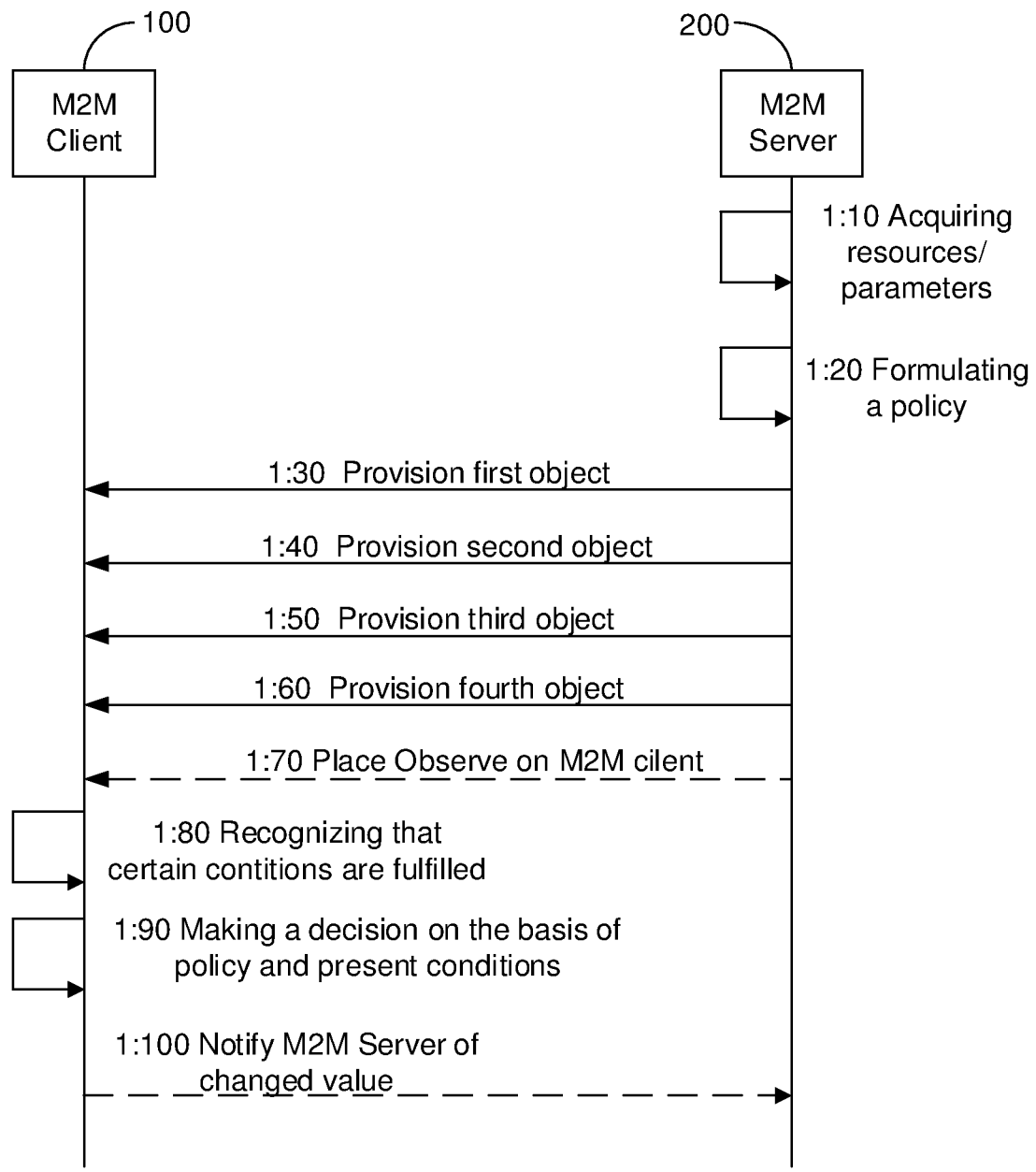
FIG. 1 is a signalling scheme illustrating an interaction scenario between a M2M server and a M2M client, comprising a policy provisioning process, according to one embodiment.

Briefly described, the present document refers to a method for enabling a M2M server to interact with a M2M client, wherein the M2M server is capable of provisioning a policy on the M2M client so that after completion of the provisioning the M2M client will be able to take decisions and execute tasks autonomously, based on the provisioned policy, without requiring any further interaction or communication with the server. In addition a M2M server and a corresponding M2M client capable of executing methods associated with the suggested provisioning are suggested. Furthermore, method steps enabling the M2M server to request for certain policy related updates once a policy has been provisioned, and the M2M client to recognize and respond to such an update, are also provided. In addition, steps for updating the suggested provisioning whenever required are also suggested.

More specifically, the present document address the problem of absence in the prior art of any mechanism for provisioning policies on a M2M client that enables decision making and processing at the M2M client with minimal intervention from the M2M server being responsible for initiating a provisioning. The lack of such policy provisioning support in present configurations have the consequence that the M2M server will have to maintain a more or less continuous communication with the M2M client, which is not a desirable situation, especially in scenarios where the M2M client form part of a constrained device, such as e.g. a LWM2M device, or a device which has gone into a sleep mode. While referring to M2M scenarios, more information can be obtained in Lightweight Machine to Machine Technical Specification, Draft version 1.0, 18 Mar. 2015.

The concept described herein is achieved by introducing new objects which enables a M2M server to provision a policy on an M2M client in such a way that the M2M client will be able to independently act according to the provisioned policy, without relying on any further interaction with the M2M server.

Although the given examples refer to M2M servers and M2M clients it is to be understood that the suggested use of M2M servers also include use of LWM2M servers, and the suggested use of M2M clients also include use of LWM2M clients, i.e. the suggested methods and arrangements are applicable both to M2M servers and clients which are to be referred to as lightweight and/or constrained devices, as well as to those which are not.

It is also to be understood that, even though the processes as described below are executed at a specific physical M2M server, the various described steps may alternatively be executed in other physical entities, or some steps may be executed or initiated e.g. by an M2M server, while other may be executed by one or more other node/s, thereby enabling e.g. cloud related solutions, where, e.g. an initiating procedure, executed at the M2M server, may launch a respective process execution at another remotely located node or entity e.g. for the purpose of more efficient use of available processing and/or storage resources.

A procedure to be executed at a M2M server 200 and a M2M client 100, according to one embodiment, will now be described in further detail with reference to FIG. 1. As a prerequisite, a M2M server 200 is capable of communicating with a plurality of M2M devices, each comprising a M2M client, here represented by M2M client 100, via a suitable interface, such as e.g. the LWM2M Device and Service Enablement Interface, and an appropriate protocol, such as e.g. COAP, or LWM2M.

In a first step 1:10 the M2M server 200 is acquiring policy related resources or parameter, i.e. input data upon which a policy, or policies, required at the M2M client 100 will be based. The resources/parameters, from hereinafter referred to solely as parameters, may be acquired from functionality within the M2M server itself, from one or more external network nodes or entities, such as e.g. M2M service layer nodes, OSS/BSS nodes, or even from the M2M client which is about to be provisioned, i.e. the M2M client may be able to influence or have impact on the policy provisioning of itself. In a typical configuration, the required parameters are acquired from a plurality of different sources, each of which may be specialised in providing a specific type of input data. Under which conditions such received resources/parameters are to be considered and evaluated will typically be based on the M2M network and/or the service provider's operational and business related logic, and is therefore out of the scope of this document.

Based on the acquired parameters, possibly in combination with previously derived and stored parameters, a required policy is being formulated, by generating objects adapted therefore, each of which comprises relevant object instances, according to required mutual dependencies, as indicated by another step 1:20. By way of example, an operator wanting to support Earth Day, decides to set all M2M clients of a specific type in a specific geographical area to sleep between 8 pm-9 pm on Sundays every second week. Consequently a policy instructing the selected M2M clients to perform such a task is formulated. As will be described in further detail below policies may be dependent on various attributes, such as e.g. time of the day or location, or a combination thereof.

Once a policy to be applicable at the M2M client 100 has been formulated by the M2M server, the M2M server initiates a provisioning process, for provisioning the formulated policy on the M2M client 100, as indicated with subsequent steps 1:30-1:60, thereby enabling for the M2M client 100 to independently apply the policy locally, upon a successful provisioning. While the provisioning as described in FIG. 1 is illustrated as the four separate steps 1:30-1:60, it is to be understood that the provisioning may be executed in more steps, in fewer steps than suggested in the figure, or even as one single step, e.g. depending on one or more of whether or not any intermediate storage is required, or wanted, at the M2M client 100, on resources available at the M2M server 200, and depending on when in time the parameters needed for policy formulation are available to the M2M client 200. In addition, although each provisioning step as described below is presented as one single step, each of these steps could be construed as one step, managing the forwarding of relevant instances to the M2M client 100, possibly in combination with storing of data, followed by the actual provisioning step. It is to be understood that by providing specific relationships between the objects of the provisioning policy rules, independent decision making can be obtained. In case of a LWM2M client, the provisioning is typically executed via the Device Management & Service Enablement Interface and Information reporting Interface.

By way of example the first object to be provisioned in step 1:30, is referred to as a PolicyTime Object, which is an object, comprising a set of time dependent instances which define one or more time windows or time intervals, each of which comprises at least a start time and a stop time, within which time window a specific decision will be allowed to be taken by the M2M client 100, applying a respective, provisioned policy. Alternatively, or in combination, one or more time windows may specifically restrict the M2M client 100 from taking the specific decision within a specific time interval. By way of example, a time window set to 00:00-06:00 could allow or restrict certain firmware/software updates to be executed on the M2M client 100 between midnight and 06:00 in the morning, while the opposite is applicable during the rest of the 24 h, provided that the remaining conditions, if any, applicable for the update have also been fulfilled. More specifically the provisioning of the first object on the M2M client 100 by the M2M server 200, as described herein, enables the M2M client 100 to apply time dependent aspects in a specific policy.

In the present example a second object, here referred to as a PolicyLocation Object, is provisioned in another step 1:40. The PolicyLocationObject comprise a set of location dependent instances that are to form part of the policy to be provisioned. By way of example, the mentioned object provisioned on a M2M client 100 located in a car or any other type of movable vehicle or device, may enable or restrict certain execution of one or more operations if being in, or close vicinity to, a specific location, specified e.g. by given coordinates or a given geographical area or zone.

The third object, provisioned in step 1:50, is referred to as a PolicyDecisionObject, which comprise instances that provision various decisions that can be referred, and linked to, from a PolicyRule object, as described below, in dependency on one or more of the previous location and/or time dependent attributes. More specifically, this third object has the purpose of specifying specific decisions to be taken by the M2M client 100, once it has been determined by the M2M client 100 that certain conditions have been fulfilled.

The fourth object, provisioned in step 1:60, is referred to as a PolicyRule object, as mentioned above, which comprise instances that provisions rules to be applied for performing one or more of the decisions as mentioned above and links to other objects and respective instances, such as e.g. location and/or time dependent instances. By returning again to the previously mentioned example for closing down a group of M2M clients every two weeks, a first rule, having a higher priority may specify that closing down of a M2M client of the specified group shall only be executed in case the power level of the M2M client exceeds a certain predefined threshold value, while a second rule, having a lower priority instead specify closing down, according to the already given condition, irrespective of the power consumption. By grouping, or linking, objects and instances together, a few location and time dependent instances may be combined in a number of ways, including the here required way, e.g. by applying the relevant priority in association with the relevant objects and instances in an appropriate combination.

Once the M2M client 100 has been provisioned, according to the procedure mentioned above, the M2M client 100 is prepared for applying the provisioned policy. It is to be understood that even though provisioning of only one policy has been descried above, a typical scenario may comprise provisioning of a plurality policies, which, based on the applied linking, may be more or less mutually dependent to each other.

At this stage the M2M client 100 may apply the one or more provisioned policies completely independent from the M2M server 200, simply by taking decisions according to the policy when required conditions are found by the M2M client 100 to be fulfilled, as indicated in step 1:80, and by making appropriate decisions on the basis of the policy and present conditions, as indicated with subsequent step 1:90.

The M2M server 200 can however assure that it is notified of specific changes and events by the M2M client 100, i.e. contacted by the M2M client 100 only when needed, by instructing the M2M client 100 to react to a specific change or event and report such a change or event accordingly to the M2M server 200. Such a procedure is initiated by the M2M server 200 in optional step 1:70, where the M2M server 200 is placing a request, here referred to as a CoAP compliant Observe, on a specific parameter, towards the M2M client 100. When the M2M client 100 recognizes that the indicated parameter value has changed, as a consequence of steps 1:80 and 1:90, this will be notified to the M2M server 200, as indicated with another optional step 1:100. More specifically, step 1:80 involves the PolicyRule instances and linked or referenced additional instances, such as e.g. PolicyLocation and/or PolicyTime instances, while step 1:90 involvePolicy Decision instances, defining which decisions to take. Steps 1:80-1:100 may be repeated whenever conditions associated with an observer request, as requested for in step 1:70, has been fulfilled. Thereby the M2M server 200 will be made aware of whenever a certain policy rule becomes active or inactivate at the M2M client 100. It is to be understood that step 1:70 may be executed at any time subsequent to provisioning of a respective, relevant policy.

The latter, optional procedure can be used by the M2M server 200 purely for tracking purposes, e.g. for being aware that the M2M client 100 is operating properly, or can be used for enabling further logic at the M2M server 200, e.g. for determining when a policy need to be updated at the M2M client 100. Based on reports from M2M clients to a M2M server on how M2M clients behave due to a present policy, the M2M server can e.g. decide to delete the present policy rule, for one or more of the M2M clients, or to decrease a present priority, so that a lower policy will instead be executed the next time the relevant conditions are met.

Parameter changes could e.g. be triggered in relation to the passing of a certain threshold value or a transition from one state to another, such as e.g. when a lamp is switched from ON to OFF, or vice versa. More specifically, once the M2M server 200 has requested to be notified of a certain change, signalling between the two entities can be restricted to when a specific parameter update explicitly indicated by the M2M server 200 to be of relevant importance has been identified by the M2M client 100, and thus the M2M client 100 need to only actively interact with the M2M server 200 when there is any update to provide to the M2M server 200. As an alternative to the described Observer/Notify procedure, the M2M server 200 may use a polling based mechanism. In case the LWM2M protocol is applied, polling can e.g. be obtained by initiating the READ operation on a periodical manner.

By applying the suggested provisioning mechanism, the amount of signalling required between the M2M server and M2M client can be significantly reduced, since conventional control signalling commonly used between the two entities can be replaced by a one-time policy provisioning, involving provisioning of inter-related objects, as described above.

From the M2M client perspective, once provisioned, the M2M client will be empowered to take decisions based on the provisioned policy without having to be in connection with, and without having to rely on any further signalling from the M2M server. Decisions can instead be taken by a M2M client on a per policy basis. An important consequence from this is that from the M2M service providers or M2M network providers point of view, the respective provider wants to have control of the M2M devices, while at the same time they will be able to provide for more efficient usage of network resources and high network availability so that a large number of M2M subscribers can be efficiently serviced with the available network resources.

In addition, the suggested policy based mechanism enables both M2M service providers and M2M network providers to obtain much better control of procedures, such as e.g. software installations and updates and restrictive access to M2M devices, while at the same time keeping signalling at a low level.

The suggested policy based mechanism also allows various entities of an operator's network, including the M2M client itself, to provide input parameters on the basis of which policies can be formulated by an M2M server, and later provisioned on the M2M client.

The suggested policy will also provide for better optimization opportunities for both M2M servers and M2M clients, such that e.g. a provisioned M2M client will be able to maintain in sleep mode as long as conditions specified by the provisioned policy are not met, while a M2M server will be able to perform operations other than handling excessive notifications from the M2M clients.

As suggested above, the suggested mechanism is very flexible, since policies may be dynamically updated on a complete or partial basis.

As suggested above, policies can be based on location and/or time constraints, which can be very useful both for mobile, as well as for fixed M2M devices. A connected car supporting a M2M location based policy may e.g. be forced to connect to different available access networks, such as e.g. Wi-Fi, 3G, or Worldwide Interoperability for Microwave Access (WiMAX), depending upon the present location of the car. In a corresponding way, a time based policy could allow a utility meter to be upgraded only at times when overall network usage is predicted to be low.

Figure 2:
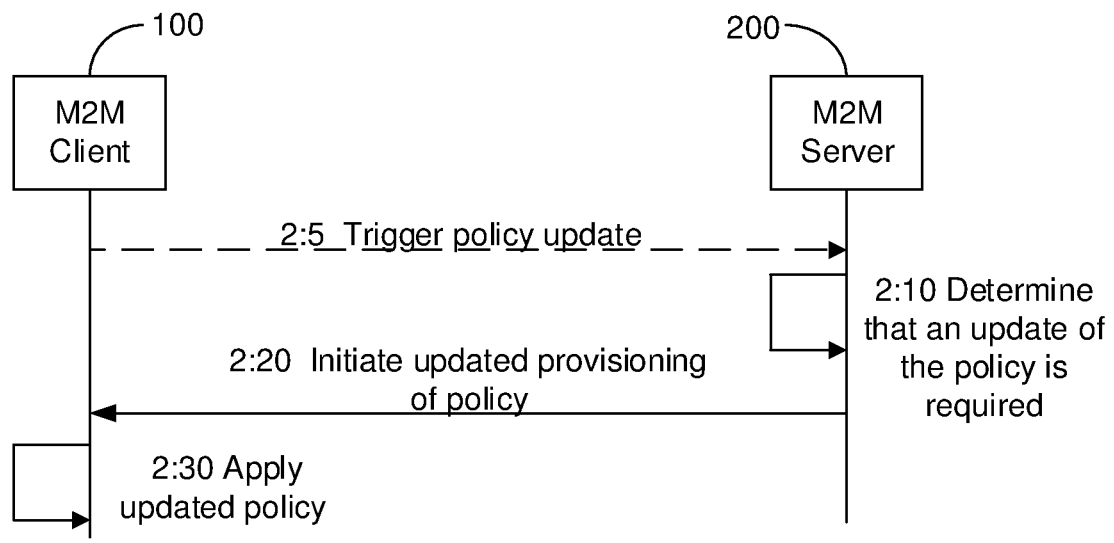
FIG. 2 is another signalling diagram illustrating a process for updating a previously provisioned policy, according to one embodiment.

FIG. 2 is a simplified signalling scheme, illustrating a procedure for updating a previously provisioned policy at a M2M client. In a first step 2:10 it is determined, by a M2M server 200, that an update of a policy is required at a M2M client 100. This may be determined, e.g. by a parameter received by the M2M server 200 from an external source, which may include also the M2M client 100, as indicated with optional step 2:5. In a next step 2:20 a required updated provisioning of the policy is initiated by the M2M server 200. The provisioning may comprise a complete or partial provisioning and may typically be executed by initiating provisioning of one or more parameters associate with the specific trigger of the update. Once the provisioning has been executed, the updated policy can be applied, as indicated with step 2:30.

Figure 3:
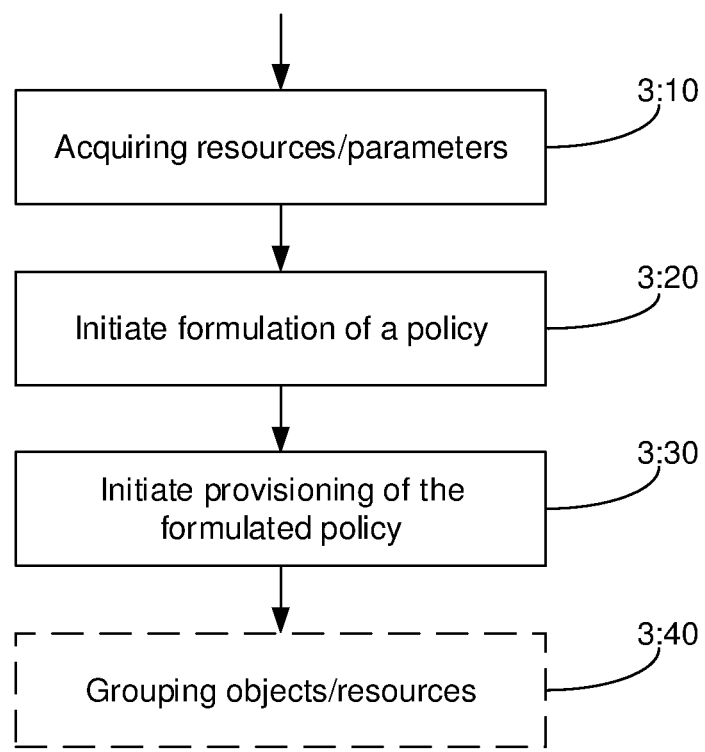
FIG. 3 is a flow chart illustrating a method executed at a M2M server for interacting with a M2M client, according to one embodiment.

FIG. 3 illustrates a method for performing the policy related mechanism as describe above, when executed at a M2M server. In a first step 3:10 the M2M server is acquiring resources/parameters needed for determining or defining a specific policy, while in a next step 3:20, the respective policy is formulated based on the acquired resources/parameters. In a subsequent step 3:30 a provisioning of the formulated policy is executed, or at least initiated by the M2M server. In another step 3:40, which can be executed in association with the provisioning of the M2M client, or at a later occasion, grouping of objects/resources is executed. By way of example, a set of PolicyTime and PolicyLocation objects, forming random Time and Location information, may initially be provisioned on a M2M client. The server may then, at a later occasion, e.g. after having collected more information on the environment of the M2M device, or any other input that may be relevant for the operators operation and/or business logic, and use this information as a basis for linking or grouping one or more of the PolicyTime and/or PolicyLocation objects for obtaining required policy rules.

Figure 4:
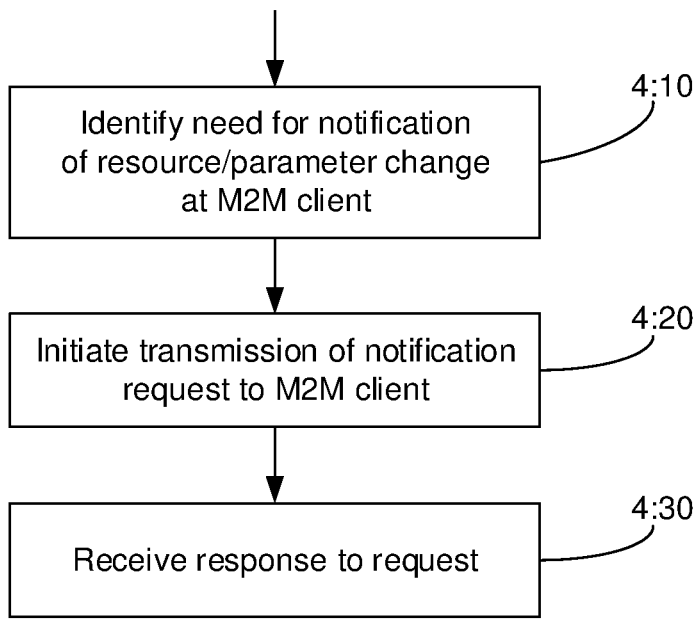
FIG. 4 is yet another flow chart illustrating a method executed at a M2M server for updating a provisioning at a M2M client, according to one embodiment.

FIG. 4 is another flow chart, illustrating how the M2M server can provide for specific updates from the M2M client. In a first step 4:10 the M2M server identify a need for notification of a specific resource/parameter change. Such a need may be identified e.g. as a result from internal processing, or initiated by an external node, forwarding a trigger to the M2M server. In a next step 4:20, the M2M server transmits the request to the M2M client, e.g. by filing an observe, or by initiating a polling based mechanism, as suggested above. In another step 4:30, a change as indicated in the request has been identified at the M2M client and a response is thus received from the M2M client by the M2M server.

Figure 5:
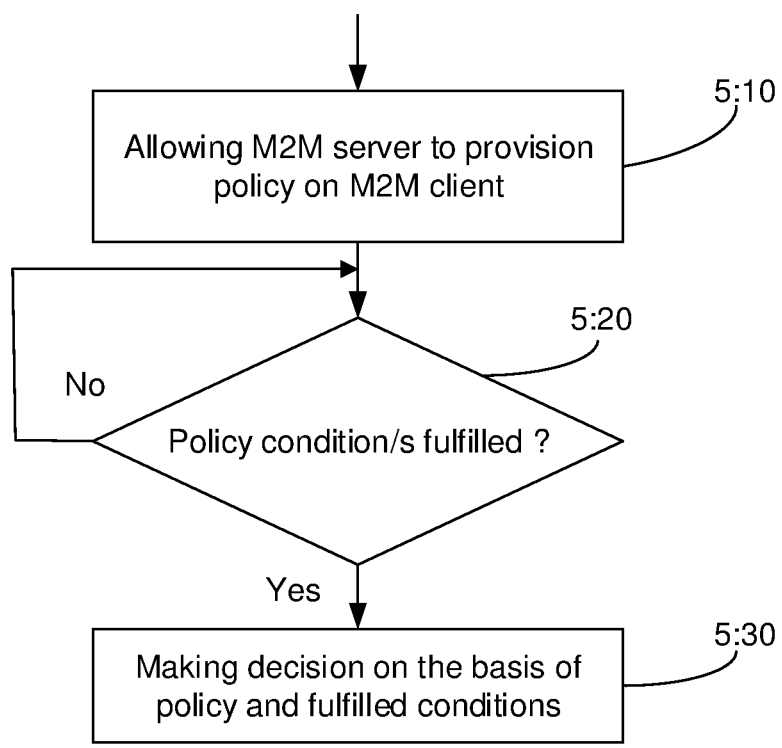
FIG. 5 is another flow chart illustrating a method executed at a M2M client being provisioned by a M2M client, according to one embodiment.

FIG. 5 is another flow chart, illustrating a method for enabling update reporting as described above at an M2M client. In a first step 5:10 the M2M server is allowed to provision a policy at the M2M client. In a next step 5:20, being executed once the provisioning of step 5:10 has been successfully completed, it is determined whether each condition needed for triggering a specific decision as defined in object instances constituting the provisioned policy has been fulfilled or not. If the M2M client determines that all required conditions are fulfilled, it makes a decision as defined in the respective object instances. As indicated below, with reference to FIG. 6, such an action may also trigger the M2M client to notify the M2M server.

Figures 6, 10:
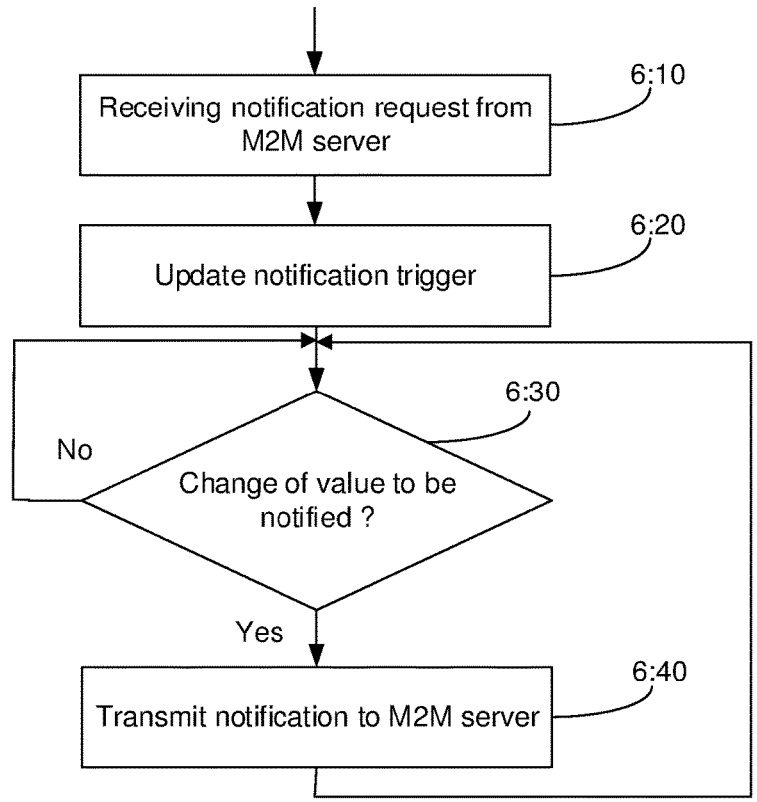
FIG. 6 is another flow chart illustrating a method executed at a M2M client for processing a notification request from a M2M server, according to one embodiment.
FIG. 10 is another table illustrating a configuration of a PolicyTime Object, according to one embodiment.

FIG. 6 is a flow chart illustrating steps executed at an M2M client for managing notifications from the M2M client to the M2M server. In a first step 6:10, the M2M client is receiving a notification request from the M2M server, i.e. a trigger indicating to the M2M client that whenever a certain value of a specific resource or object is changed, the M2M client shall report this change to the M2M server. In a next step 6:20 the M2M client updates its repository or storage with the trigger. In a next step 6:30, the M2M client is recognizing whenever a change has occurred and is to be notified to the M2M server, as indicated with subsequent step 6:40. This process is continued, such that a new notification is triggered each time the respective value is being changed, until the M2M client is receiving a notification request, in a new step 6:10, which is stating that a different condition should apply for the notifications to be sent, or that the sending of previously requested notifications should be stopped.

FIG. 7 is illustrating a PolicyRule object 700, comprising a plurality of instances enabling linking of objects so that a provisioning of a M2M client can be executed, as suggested above. This object enables a provisioned M2M client to determine whether or not a policy related parameter is to be activated or deactivated.

In the given example, PolicyRule object 700 is identifiable by object ID, which in the given example equals 20. The PolicyRule object 700 comprises a plurality of resources, here referred to as ID, or resource ID 0, 1, 2 and 3, respectively, each indicating possible operations, i.e. whether the resource is a readable (R) resource only, or if it is a resource which can be both writable and readable (RW), whether the resource is a resource that can comprise one single (Single) or multiple (Multiple) instances.

RulePriority, having resource ID 0, specifies a relative priority of each policy rule instance specified in object ID 20. Consequently, in case a plurality of policies are fulfilled simultaneously, as will be explained below, the M2M client will be able to select the policy defined in the PolicyRule object having the highest priority and activate/inactivate only that policy according to the selected PolicyRule object.

The RuleActive resource, indicated as resource ID 1 in the given example, is a Boolean, indicating whether a policy rule defined in the PolicyRule object is to be active, i.e. set to "true", or if it is to be inactive, i.e. set to false. This is a typical resource for which a parameter change notification can be requested by the M2M server and, consequently, which change can be reported or notified to the M2M server.

The ConditionalRef (CondRef) resource, here having resource ID 2, maintains a list of references to conditions that need to be met in order for the givenPolicyRule instance to be active. In other words, RuleActive will change from "false" to "true", i.e. from inactive to active, when all conditions identified by CondRef are fulfilled, and, correspondingly, RuleActive, will be inactivated when at least one of the conditions is no longer fulfilled. The references are made to other objects and associated instances, such as e.g. relevant PolicyLocation and/or PolicyTime objects, and/or any other dedicated object/s.

The DecisionRef resource, here identified as resource ID 3, is maintaining another list of references to decisions or operations that need to be taken when the RuleActive is made active, as indicated above. These decisions are contained in a PolicyDecision object. As indicated in FIG. 7, both the CondRef resource and the DecisionRef resource are indicated as optional resources, thereby allowing both for backwards compatibility, and the option to choose either to apply the mechanism suggested in this document or not to apply it, or to apply any of these resources at a later stage.

Figure 8:
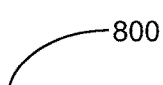
FIG. 8 is another table illustrating a configuration of a PolicyDecision Object, according to one embodiment.

FIG. 8 is illustrating a PolicyDecison object 800, comprising a plurality of instances enabling a M2M client to execute operations referenced to from a PolicyRule object that has been activated due to fulfilled conditions.

The PolicyDecision object is here identifiable by Object ID 23 and comprises three resources, identifiable as resource ID 0, 1 and 2 respectively. The ResourceImpact resource, here having resource ID 0, provides a list of URIs of functions or devices on which indicated operations will be executed when allowed, according to AllowOperation resource, as described below. A function may e.g. be a lamp that shall be controlled according to a certain, provisioned policy, where the operations can be read (R), meaning that the present state, i.e. "ON" or "OFF", is determined or read, or write (W), meaning that the state is set to "ON" or "OFF". The OperationImpact resource is representing another list, comprising operation, such as (R) or (W), to be executed on the functions as listed in the ResourceImpact resource.

Operations listed under OperationImpact will only be executed if the boolean AllowOperation resource is set to "true", so in case an operation is to be executed or activated at a specific condition this resource is set to true, while if a condition shall result in the prohibiting or inactivation of a certain function this resource is set to "false". A NewValue resource, here represented as resource ID 4, typically represented by a string, may comprise a new value to replace a present one, in case conditions for a write operation are true.

By way of example, in a smart home, comprising the five connected functions TV, fridge, fan, light and washing machine, each comprising separate M2M clients, a M2M server wants to provision policies allowing: read operations on TV and fridge, write operations on the fan and light while no operations are needed for the washing machine. This provision may be set to be applicable at a certain time window. In the present scenario, a first ResourceImpact resource of a first PolicyDecision object will comprise a URI of the TV, or more specifically of a function of the TV, capable of at least sensing the state of the TV, while a first OperationImpact resource will indicate a read operation and a first AllowOperation will be set to "true". A second ResourceImpact resource of a second PolicyDecision object will comprise a URI to a function of the fridge, capable of at least sensing the temperature, while a second OperationImpact resource will indicate a read operation and a second AllowOperation will be set to "true". A third ResourceImpact resource of a third PolicyDecision object will comprise a URI to a function of the fan, capable of controlling e.g. the speed of the fan, while a third AllowOperation resource is set to "true". A fourth ResourceImpact resource of a fourth PolicyDecision object comprise a URI to a function, capable of controlling the light to the lamp, while a fourth OperationImpact resource will indicate a write operation, while a fourth AllowOperation resource is set to "true". A fifth ResourceImpact resource of a fifth PolicyDecision Object will comprise a URI to a function of the washing machine capable of controlling this machine, while a fifth AllowOperation resource will be set to "false".

FIG. 9 is illustrating a PolicyLocation object 900, comprising a plurality of instances enabling a M2M client to activate or inactivate a policy based on a current location of a M2M client. The PolicyLocation object of FIG. 9 is here identifiable as Object ID 21, and comprises resource ID, 0, 1, 2, and 3. The GeoLat resource, here identified as resource ID 0, defines a specific latitude, while the GeoLong resource, here identified as resource 1, defines a specific longitude, a GeoAlt resource, here identified as resource ID 2, is defining a specific altitude over sea level, while a GeoProximity resource, identified as ID 3, is defining a specific allowed accuracy for the other given resources. Alternatively, different accuracies may be given for different resources.

In a corresponding way FIG. 10 is illustrating a PolicyTime object 1000, comprising instances enabling a M2M client to activate or inactivate a policy based on the time of the day. The PolicyTime object is here identifiable as object ID 22, and comprises the two resource ID 0 and 1. The StartTime resource, here identified as resource ID 0, is indicating a start time, while the StopTime resource, here identified as resource ID 1, is indicating a stop time. The given times may be expressed e.g. in Unix timestamp.

Figure 11:
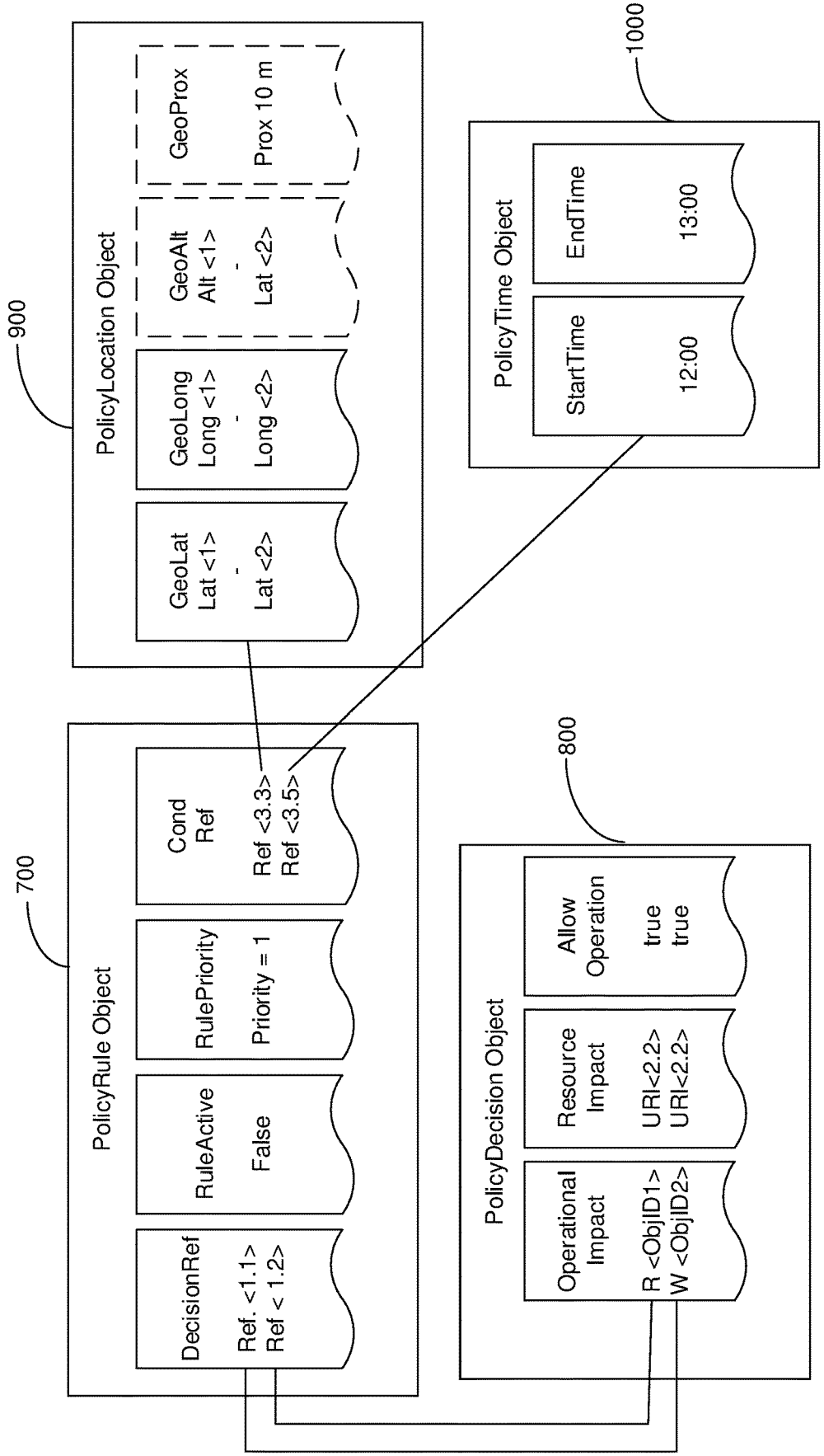
FIG. 11 is illustrating a plurality of Objects and their mutual relationships, according to one embodiment.

In a corresponding way, additional objects, comprising suitable resources, may be used, such as e.g. a temperature dependent object, specifying an allowed or non-wanted temperature interval, thereby enabling temperature dependent operations to be executed. FIG. 11 is an overview, illustrating how the different described objects and their resources may be mutually linked to each other, so that required policies can be provisioned. As indicated in FIG. 11, conditional references (CondRef) comprises one reference to a PolicyLocation object 900, defining were geographically a policy is to be applicable, and one PolicyTime object 1000, defining when in time the policy is to be applied. The PolicyRule object 700 has also been set to a high priority (priority=1) which will guarantee that when the conditions set in the other objects are fulfilled the specified policy, which is presently set to "false" in the RuleActive resource will be executed. The DecisionRef resource comprises two references to an OperationaImpact resource in a PolicyDecision object 800, and more specifically to two different operations, namely a read operation followed by a write operation. As indicated in the ResourceImpact object, the two operations are applicable on one and the same function, and according to the AllowOperation resource, both operations are set to "true" i.e. they are to be executed when the given conditions referred to in the CondRef resource have been fulfilled, and, thus, as a result, the RuleActive resource has been changed from "false" to "true".

An M2M server, capable of executing the method according to FIGS. 3 and 4 is also suggested herein and will now be described in more detail below. It is to be understood that an M2M server as described herein may be adapted to execute one or more of the steps mentioned in this document by itself. Alternatively, one or more steps may be executed in another physical and/or logical device or unit, such as e.g. a cloud based unit, upon initiation of the M2M server.

Since the M2M server is particularly suitable for managing provisioning of constrained devices, both the M2M client and the M2M server are compliant with the LWM2M standard, including the CoAP, running on transports like UDP/SMS, or DTLS protocols.

According to a first embodiment, an M2M server 1200 can be configured as a plurality of interacting modules or units, as illustrated in FIG. 12. The M2M server 1200 of FIG. 12 comprise an acquiring module 1210, configured to acquire resources/parameters, corresponding to step 3:10 of FIG. 3, a formulating and grouping module 1220, configured to formulate policies from objects and parameters/resources, according to certain requirements, corresponding to step 3:20 of FIG. 3, typically provided through a conventional user interface (not shown), a provisioning module 1240, configured to provision an M2M agent (not shown), corresponding to step 3:30 of FIG. 3, via the communication module 1230. In accordance with step 3:40 in FIG. 3, the formulating and grouping module 1220 is also configured to group previously provisioned objects and parameters/resources.

In case the M2M server 1200 is also capable of requesting notifications from an M2M client, a notification module 1250 is configured to identify a need for notification of a resource/parameter change at the M2M client, corresponding to step 4:10 of FIG. 4, while the communication module 1230 is configured to transmit the request to the M2M client, corresponding to step 4:20, and to, eventually receive a response to the request, in case such an event is happening, corresponding to step 4:30 of FIG. 4. Alternatively, the M2M server may comprise more than one communication modules, or output/input interfaces, for enabling the M2M communication, as mentioned above.

Figure 14:
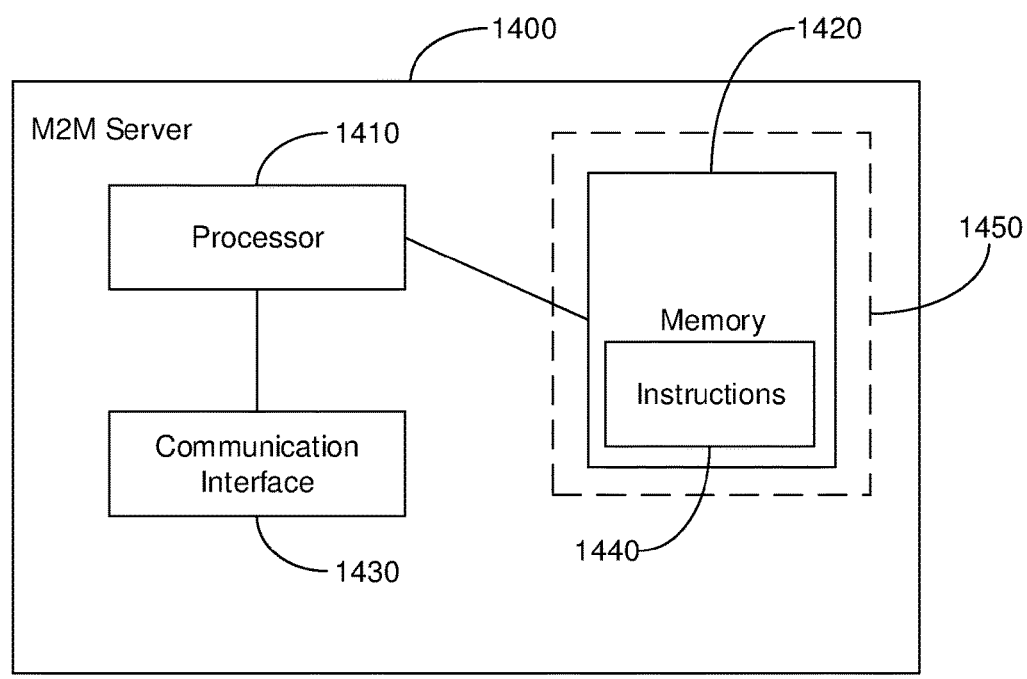
FIG. 14 is a block scheme illustrating a M2M server, according to a second embodiment.
Figure 15:
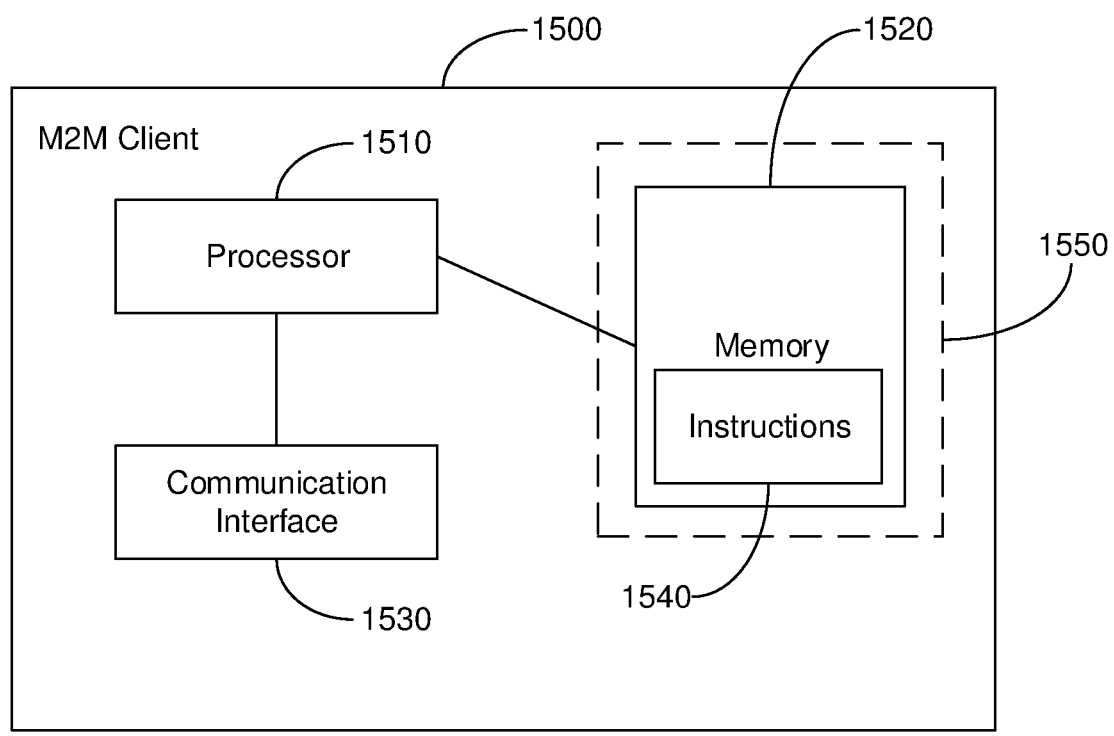
FIG. 15 is a block scheme illustrating a M2M client, according to a second embodiment.

According to a second embodiment, which is illustrated in FIG. 14, a M2M server 1400 is configured as comprising a processor 1410 and a memory 1420, capable of storing computer readable instructions 1440, or code, which when executed by the processor 1410, causes the M2M server 1400 to execute the method as described herein with reference to FIG. 3 or 4. The processor 1410 is provided, using any combination of one or more of a suitable Central Processing Unit (CPU), microcontroller, Digital Signal Processor (DSP), or Application Specific Integrated Circuit, capable of executing the mentioned, stored software instructions, while the memory 1420, can be any combination of a Random Access Memory (RAM) and Read Only Memory (ROM), comprising also persistent storage, arranged as a single entity or a combination of magnetic memory, optical memory, solid state memory, or even a remotely mounted memory.

More specifically, when the instructions are executed by the processor, the M2M server 1400 is, according to one embodiment, caused to: acquire resources and/or parameters for provisioning a policy applicable for the M2M client 1300;1500; initiate formulation of the policy by arranging policy dependent mutually associated objects based on the acquired resources and/or parameters, such that a M2M client 1300;1500 on which the policy has been provisioned is capable of making decisions on the basis of the formulated policy without having to communicate with any external device, and initiate provisioning of the policy by provisioning the mentioned objects on the M2M client 1300;1500.

In order to be able to get updates of a specific resource or parameter from a provisioned M2M client 1300;1500, the memory 1420 also comprise instructions which when executed by the processor 1410 causes the M2M server 1400 to: identify a need for notifications of an executed change of a value of one of the resources or parameters at the M2M client 1300;1500; initiate transmission of a request for said notifications to the M2M client 1300;1500, and receive, from the M2M client 1300;1500, in response to the request, a notification of a change of said value at the M2M client 1300;1500.

At a M2M server 1400, which is capable of updating a provisioned policy, the memory 1420 also comprise instructions which when executed by the processor 1410 causes the M2M server 1400 to determine that an update of the previously provisioned policy is required, by updating at least one of said resources or parameters, and initiate updated provisioning of the policy on the M2M client 1300;1500.

The M2M server 1400 is configured to initiate formulation of a policy in a plurality of steps, where the memory 1420 comprise instructions which when executed by the processor 1410 causes the M2M server 1400 to configure a first object, comprising resources and/or parameters indicative of at least one condition that need to be met for the M2M client 1300;1500 in order to activate or inactivate the mentioned provisioned policy. According to one embodiment priorities may be applicable, wherein the instructions are arranged to cause the M2M server 1400 to configure the first object, such that a respective priority is applicable for the mentioned at least one condition.

Furthermore, the instructions are typically also arranged to cause the M2M server 1400 to configure a second object, comprising resources and/or parameters indicative of at least one time dependent condition that need to be met for the M2M client 1300;1500 to activate or inactivate the mentioned provisioned policy; a third object comprising resources and/or parameters indicative of at least one location dependent condition that need to be met for the M2M client 1300;1500 to activate or inactivate said provisioned policy and a fourth object comprising resources and/or parameters, indicative of operations executable by said M2M client 1300;1500, when associated conditions have been met at the M2M client 1300;1500.

Once the objects mentioned above have been formulated, the M2M server 1400 may group objects in a desired way. This can either be done either in association with the above mentioned policy formulation, or it can be done at a later occasion. Therefore instructions are arranged to cause the M2M server 1400 to finalize policy formulation by grouping objects, by mutually linking the objects to be grouped together and their associated resources so that a policy for executing predefined operations according to predefined conditions is obtained.

The M2M server 1400 may be configured as any type of stand-alone or integrated M2M server, as long as it is capable of being configured according to any of the embodiments mentioned above, including also M2M servers which are LWM2M compliant.

Furthermore, a computer program, comprising instructions 1440, enabling execution of any of the methods according to FIG. 3 or 4, when run on a device, such as the M2M server 1400, is provided. A computer program product 1450, comprising computer readable means, and a computer readable means, on which the mentioned computer program is stored, is also suggested. The computer program product 1450, may e.g. be an optical disc, such as a Compact Disc (CD), a Digital Versatile Disc (DVD), a Blue-Ray Disc, as a removable, solid state memory, e.g. a flash storage memory, such as e.g. a Universal Serial Bus (USB) drive.

An M2M client, typically arranged as a constrained device or forming part of any other type of M2M device or Machine Type Communications (MTC) device, capable of executing the method according to FIGS. 5 and 6 is suggested and will now be described in more detail below.

In order for the M2M client to also be able to handle notifications to a M2M server, the M2M client can also be configured therefore. More specifically, a M2M client which is compliant to a suitable standard, including the CoAP, running on transports like UDP/SMS, or DTLS protocols, is suggested.

Figure 13:
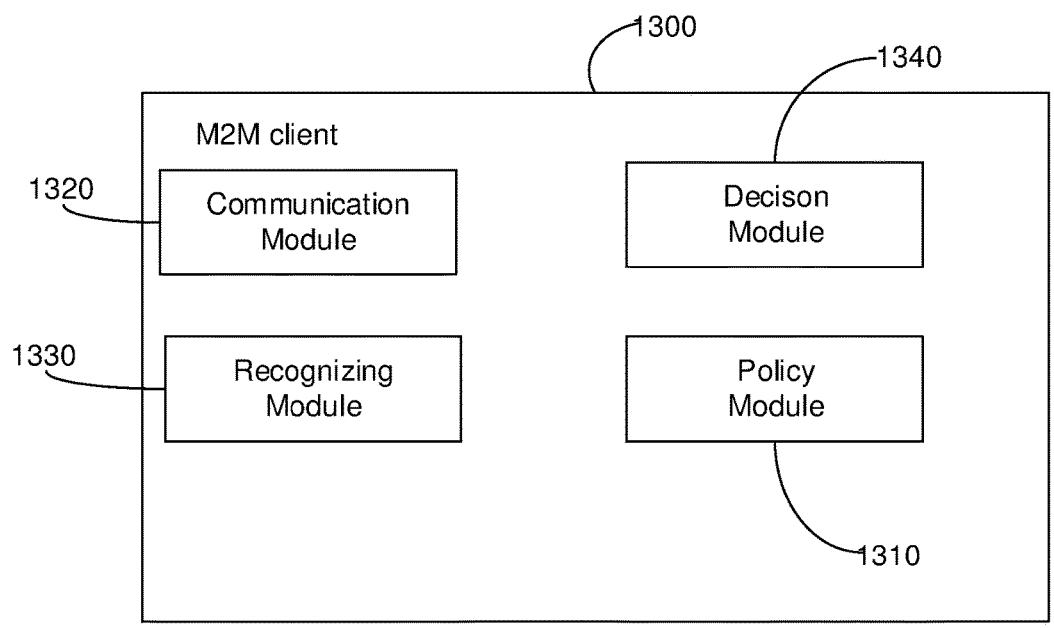
FIG. 13 is a block scheme illustrating a M2M client, according to a first embodiment.

According to a first embodiment, an M2M client 1300;1500 is configured as comprising a plurality of interacting modules or units, as illustrated in FIG. 13. The M2M client 1300 of FIG. 13 comprise: a policy module 1310, enabling the M2M server 1200;1400 to provision a policy at the M2M client 1300;1500, via a communication module 1320, as defined by mutually associated objects; a recognizing module 1330, configured to recognize that at least one condition, specified by resources and/or parameters associated with said policy, is fulfilled, and a decision making module 1340, configured to make a decision on the basis of the mentioned policy and the fulfilled associated conditions, without having to communicate with any external device.

According to a second embodiment, a M2M client 1500 is configured as comprising a processor 1510 and a memory 1520, capable of storing computer readable instructions 1540, or code, which when executed by the processor 1510, causes the M2M client 1500 to execute the method as described herein with reference to FIG. 5 or 6. The processor 1510 is provided, using any combination of one or more of a suitable Central Processing Unit (CPU), microcontroller, Digital Signal Processor (DSP), or Application Specific Integrated Circuit, capable of executing the mentioned, stored software instructions, while the memory 1520, can be any combination of a Random Access Memory (RAM) and Read Only Memory (ROM), comprising also persistent storage, arranged as a single entity or a combination of magnetic memory, optical memory, solid state memory, or even a remotely mounted memory.

More specifically, when the instructions are executed by the processor, the M2M client 1500 is, according to one embodiment, caused to: allow the M2M server 1200;1400 to provision a policy as defined by mutually associated objects at the M2M client 1500; recognize that at least one condition specified by resources and/or parameters associated with said policy is fulfilled, and to make a decision on the basis of said policy and the fulfilled associated conditions, without having to communicate with any external device.

In order to be able to provide updates to the M2M server 1200;1400, the M2M client 1500 typically also comprise instructions which when executed by the processor, causes the M2M client 1500 to: receive a request from the M2M server 1200;1400 requesting the M2M client 1500 to notify the M2M server 1200;1400 of an executed change of a value of one of the resources or parameters at the M2M client 1300;1500; recognize a change of the value of one of the resources or parameters, and transmit a notification of the requested and recognized change to the M2M server 1200;1400.

Furthermore, in order to be able to update provisioned policies when required, the M2M client 1500 may also comprise instructions which when executed by the processor, causes the M2M client 1500 to: allow the M2M server 1200;1400 to update the previously provisioned policy by provisioning the policy with updated resources and/or parameters, and apply the updated at least one resource or parameter when making decisions on the basis of said policy and fulfilled associated conditions.

When making a decision as suggested above, various, mutually dependent objects, need to be considered by the M2M client 1500. For this reason, the M2M client 1500 also comprise instructions which when executed by the processor, causes the M2M client 1500 to make the mentioned decision by considering resources and/or parameters of a first object and indicative of at least one condition that need to be met for the M2M client 1500 to activate or inactivate the mentioned provisioned policy. In the latter case the M2M client 1500 may be caused to make a decision by considering a resource and/or parameter of the first object by specifying a respective priority, applicable for the mentioned at least one condition.

Furthermore, the M2M client 1500 may comprise instructions which when executed by the processor, causes the M2M client 1500 to make a decision by considering resources and/or parameters of a second object indicative of at least one time dependent condition that need to be met for the M2M client 1500 to activate or inactivate the mentioned provisioned policy; by considering a third object indicative of at least one location dependent condition that need to be met for the M2M client 1500 to activate or inactivate the mentioned provisioned policy and by considering a fourth object, indicative of operations executable by said M2M client 1500 when said conditions have been met at the M2M client 1500.

As already mentioned, the M2M client 1500 may also itself be involved in a provision procedure of itself. In the latter case, the M2M client 1550 also comprise instructions which when executed by the processor, causes the M2M client 1500 to: acquire a parameter value; determine that the acquired parameter value is relevant for provisioning of the M2M client 1500; transmit the parameter value to the M2M client 1500, and allow the M2M server to provision the M2M client 1500, based on the mentioned parameter.

The M2M client 1400;1500 according to any of the embodiments above may e.g. be a LWM2M compliant M2M client.

Furthermore, a computer program, comprising instructions 1540, enabling execution of any of the methods according to FIG. 5 or 6, when run on a device, such as the M2M client 1500, is provided. A computer program product 1550, comprising computer readable means, on which the mentioned computer program is stored, is also suggested. The computer program product 1550, may e.g. be an optical disc, such as a Compact Disc (CD), a Digital Versatile Disc (DVD), a Blue-Ray Disc, as a removable, solid state memory, e.g. a flash storage memory, such as e.g. a Universal Serial Bus (USB) drive.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

An inventive scope has been described above with reference to a few embodiments. However, as is readily appreciated by a person skilled in the art, other embodiments than the ones disclosed above are equally possible within the presented inventive scope, as defined by the appended patent claims.

The invention claimed is:

1. A method, executed at a Machine To Machine (M2M) server, for interacting with a remotely located M2M client, the method comprising:
    acquiring resources and/or parameters for provisioning a policy applicable for the M2M client;
    initiating formulation of the policy by arranging policy dependent mutually associated objects based on the resources and/or parameters, such that a M2M client on which the policy has been provisioned is capable of making decisions based on the policy without having to communicate with any external device,
    wherein formulation of the policy comprises configuring a first object comprising resources and/or parameters indicative of at least one condition that needs to be met for the M2M client to activate or inactivate the provisioned policy, wherein the formulation of the policy comprises configuring the first object such that a respective priority is applicable for the at least one condition; and
    initiating provisioning of the policy by provisioning the objects on the M2M client.

2. The method of claim 1, further comprising:
    identifying a need for notifications of an executed change of a value of one of the resources or parameters at the M2M client;
    initiating transmission of a request for the notifications to the M2M client; and
    receiving, from the M2M client and in response to the request, a notification of a change of the value at the M2M client.

3. The method of claim 1, further comprising:
    determining that an update of the previously provisioned policy is required, by updating at least one of the resources or parameters, and
    initiating updated provisioning of the policy on the M2M client.

4. The method of claim 1, wherein the formulation of the policy comprises configuring a second object comprising resources and/or parameters indicative of at least one time dependent condition that needs to be met for the M2M client to activate or inactivate the provisioned policy.

5. The method of claim 1, wherein the formulation of the policy comprises configuring a third object comprising resources and/or parameters indicative of at least one location dependent condition that need to be met for the M2M client to activate or inactivate the provisioned policy.

6. The method of claim 1, wherein the formulation of the policy comprises configuring a fourth object comprising resources and/or parameters indicative of operations executable by the M2M client when associated conditions have been met at the M2M client.

7. The method claim 1, wherein the formulation of the policy comprises grouping objects, by mutually linking the objects and their associated resources, so that a policy for executing predefined operations according to predefined conditions is obtained.

8. The method of claim 1, further comprising:
    acquiring a parameter value;
    determining that the acquired parameter value is relevant for provisioning of the M2M client;
    transmitting the parameter value to the M2M client, and allowing the M2M server to provision the M2M client based on the parameter.

9. A non-transitory computer readable recording medium storing a computer program product for controlling a Machine To Machine (M2M) server for enabling interacting with a remotely located M2M client, the computer program product comprising software instructions which, when run on processing circuitry of the M2M server, causes the M2M server to:
    acquire resources and/or parameters for provisioning a policy applicable for the M2M client;
    initiate formulation of the policy by arranging policy dependent mutually associated objects based on the resources and/or parameters, such that a M2M client on which the policy has been provisioned, is capable of making decisions based on the policy without having to communicate with any external device,
    wherein formulation of the policy comprises configuring a first object comprising resources and/or parameters indicative of at least one condition that needs to be met for the M2M client to activate or inactivate the provisioned policy, wherein the formulation of the policy comprises configuring the first object such that a respective priority is applicable for the at least one condition; and
    initiating provisioning of the policy by provisioning the objects on the M2M client.

10. A method executed at a Machine To Machine (M2M) client capable of interacting with a remotely located M2M server, the method comprising:
    allowing the M2M server to provision a policy as defined by mutually associated objects at the M2M client;
    recognizing that at least one condition specified by resources and/or parameters associated with the policy is fulfilled;
    making a decision based on the policy and the fulfilled associated conditions without having to communicate with any external device, wherein the making the decision comprises considering resources and/or parameters of a first object and indicative of at least one condition that needs to be met for the M2M client to activate or inactivate the provisioned policy, wherein making the decision comprises considering a resource and/or parameter of the first object specifying a respective priority applicable for the at least one condition, and
    initiating provisioning of the policy by provisioning the objects on the M2M client.

11. The method of claim 10, further comprising:
    receiving a request, from the M2M server, requesting the M2M client to notify the M2M server of an executed change of a value of one of the resources or parameters at the M2M client;
    updating a notification trigger based on the received notification request;
    recognizing a change of the value of one of the resources or parameters; and
    transmitting a notification of the requested and recognized change to the M2M server.

12. The method of claim 10, further comprising:
allowing the M2M server to update the previously provisioned policy by provisioning the policy with updated resources and/or parameters; and
applying the update to at least one resource or parameter when making decisions based on the policy and fulfilled associated conditions.

13. The method of claim 10, wherein making the decision comprises considering resources and/or parameters of a second object indicative of at least one time dependent condition that needs to be met for the M2M client to activate or inactivate the provisioned policy.

14. The method of claim 10, wherein making the decision comprises considering resources and/or parameters of a third object indicative of at least one location dependent condition that needs to be met for the M2M client to activate or inactivate the provisioned policy.

15. The method of claim 10, wherein making the decision comprises considering resources and/or parameters of a fourth object indicative of operations executable by the M2M client when the conditions have been met at the M2M client.

16. A non-transitory computer readable recording medium storing a computer program product for controlling a Machine To Machine (M2M) client capable of interacting with a remotely located M2M server, the computer program product comprising software instructions which, when run on processing circuitry of the M2M client, causes the M2M client to:
allow the M2M server to provision a policy, as defined by mutually associated objects at the M2M client;
recognize that at least one condition specified by resources and/or parameters associated with the policy is fulfilled;
make a decision based on the policy and the fulfilled associated conditions without having to communicate with any external device, wherein making the decision comprises considering resources and/or parameters of a first object and indicative of at least one condition that needs to be met for the M2M client to activate or inactivate the provisioned policy, wherein making the decision comprises considering a resource and/or parameter of the first object specifying a respective priority applicable for the at least one condition and initiating provisioning of the policy by provisioning the objects on the M2M client.

17. A Machine To Machine (M2M) server for interacting with a remotely located M2M client, the M2M server comprising:
processing circuitry;
memory containing instructions executable by the processing circuitry, whereby the M2M server is operative to:
acquire resources and/or parameters for provisioning a policy applicable for the M2M client;
initiate formulation of the policy by arranging policy dependent mutually associated objects based on the resources and/or parameters, such that a M2M client on which the policy has been provisioned is capable of making decisions based on the
policy without having to communicate with any external device, wherein formulation of the policy comprises configuring a first object comprising resources and/or parameters indicative of at least one condition that needs to be met for the M2M client to activate or inactivate the provisioned policy, wherein the formulation of the policy comprises configuring the first object such that a respective priority is applicable for the at least one condition; and
initiate provisioning of the policy by provisioning the objects on the M2M client.

18. The M2M server of claim 17, wherein the instructions are such that the M2M server is operative to:
identify a need for notifications of an executed change of a value of one of the resources or parameters at the M2M client;
initiate transmission of a request for the notifications to the M2M client; and
receive, from the M2M client, in response to the request, a notification of a change of the value at the M2M client.

19. The M2M server of claim 17, wherein the instructions are such that the M2M server is operative to:
determine that an update of the previously provisioned policy is required, by updating at least one of the resources or parameters; and
initiate updated provisioning of the policy on the M2M client.

20. The M2M server of claim 17, wherein the instructions are such that the M2M server is operative to formulate the policy by configuring a second object comprising resources and/or parameters indicative of at least one time dependent condition that needs to be met for the M2M client to activate or inactivate the provisioned policy.

21. The M2M server of claim 17, wherein the instructions are such that the M2M server is operative to formulate the policy by configuring a third object comprising resources and/or parameters indicative of at least one location dependent condition that needs to be met for the M2M client to activate or inactivate the provisioned policy.

22. The M2M server of claim 17, wherein the instructions are such that the M2M server is operative to formulate the policy by configuring a fourth object comprising resources and/or parameters indicative of operations executable by the M2M client when associated conditions have been met at the M2M client.

23. The M2M server of claim 17, wherein the instructions are such that the M2M server is operative to formulate the policy by grouping objects, by mutually linking the objects and their associated resources so that a policy for executing predefined operations according to predefined conditions is obtained.

24. The M2M server of claim 17, wherein the M2M server is a Light Weight M2M compliant M2M server.

25. A Machine To Machine (M2M) client capable of interacting with a remotely located M2M server, the M2M client comprising:
processing circuitry;
memory containing instructions executable by the processing circuitry, whereby the M2M client is operative to:
allow the M2M server to provision a policy as defined by mutually associated objects at the M2M client;
recognize that at least one condition specified by resources and/or parameters associated with the policy is fulfilled;
make a decision based on the policy and the fulfilled associated conditions without having to communicate with any external device, wherein making the decision comprises considering resources and/or parameters of a first object and
indicative of at least one condition that needs to be met for the M2M client to activate or inactivate the provisioned policy, wherein making the decision comprises considering a resource and/or parameter of the first object specifying a respective priority applicable for the at least one condition and initiating provisioning of the policy by provisioning the objects on the M2M client.

26. The M2M client of claim 25, wherein the instructions are such that the M2M client is operative to:

receive a request from the M2M server requesting the M2M client to notify the M2M server of an executed change of a value of one of the resources or parameters at the M2M client;

recognize a change of the value of one of the resources or parameters; and transmit a notification of the requested and recognized change to the M2M server.

27. The M2M client of claim 25, wherein the instructions are such that the M2M client is operative to:

allow the M2M server to update the previously provisioned policy by provisioning the policy with updated resources and/or parameters; and apply the update to at least one resource or parameter when making decisions based on the policy and fulfilled associated conditions.

28. The M2M client of claim 25, wherein the instructions are such that the M2M client is operative to make the decision by considering resources and/or parameters of a second object indicative of at least one time dependent condition that needs to be met for the M2M client to activate or inactivate the provisioned policy.

29. The M2M client of claim 25, wherein the instructions are such that the M2M client is operative to make the decision by considering resources and/or parameters of a third object indicative of at least one location dependent condition that needs to be met for the M2M client to activate or inactivate the provisioned policy.

30. The M2M client of claim 25, wherein the instructions are such that the M2M client is operative to make the decision by considering resources and/or parameters of a fourth object indicative of operations executable by the M2M client when the conditions have been met at the M2M client.

31. The M2M client of claim 25, wherein the instructions are such that the M2M client is operative to:

acquire a parameter value;

determine that the acquired parameter value is relevant for provisioning of the M2M client;

transmit the parameter value to the M2M client; and allow the M2M server to provision the M2M client, based on the parameter.

32. The M2M client of claim 25, wherein the M2M client is a Light Weight M2M compliant M2M client.

* * * * *